United States Patent [19]

Faucher

[11] Patent Number: 4,488,672

[45] Date of Patent: Dec. 18, 1984

[54] THERMAL PRESS HAVING INSERT DRIVING AIR BIASING MECHANISM

[75] Inventor: James M. Faucher, Worcester, Mass.

[73] Assignee: C.E.M. Co., Inc., Danielson, Conn.

[21] Appl. No.: 405,044

[22] Filed: Aug. 4, 1982

[51] Int. Cl.³ .............................................. B27F 4/00
[52] U.S. Cl. ................................................... 227/156
[58] Field of Search ................ 227/114, 156, 116, 120

[56] References Cited

U.S. PATENT DOCUMENTS 3,926,356  12/1975  Still ..................................... 227/114

FOREIGN PATENT DOCUMENTS 1513052  6/1974  United Kingdom .
1429709  3/1976  United Kingdom ................ 227/156

Primary Examiner—Paul A. Bell
Attorney, Agent, or Firm—Hayes & Reinsmith

[57] ABSTRACT

A thermal press for installing metal inserts into a workpiece of thermoplastics material is disclosed and includes a reciprocating driver supported on a frame for movement toward and away from the workpiece. The driver includes a heated bit engageable with an insert positioned upon the workpiece when the driver is moved into a ready operative position and applies heat directly to the insert causing it to locally melt the thermoplastics workpiece. The thermal press features an adjustable air biasing mechanism which is automatically activated upon movement of the driver into its ready operative position after arrest of the bit in its insert engagement position whereby the air biasing means drives the bit independently of the driver to apply a predetermined insert driving force on the bit to fully install the insert into the workpiece upon softening of its thermoplastics material.

16 Claims, 5 Drawing Figures

THERMAL PRESS HAVING INSERT DRIVING AIR BIASING MECHANISM

FIELD OF THE INVENTION

This invention generally relates to a thermal press and particularly concerns a hand-operated thermal press for installing metal inserts integrally into a thermoplastics workpiece.

BACKGROUND OF THE INVENTION

A variety of different industrial applications require the insertion of various types of metal fasteners into thermoplastics components with high pull-out resistance, rotational resistance and resistance to vibration and back-out torque. In addition, numerous applications are encountered which additionally require a relatively high degree of uniformity of such fastener insertion wherein metal fittings such as bushes, studs and the like are required to be fully installed in precisely flush relation to an upper surface, e.g., of a thermoplastics component.

The known apparatus for installing metal inserts into thermoplastics material wherein the inserts are heated to cause localized melting and flow of the thermoplastics material to enable insertion to take place are subject to a number of drawbacks, particularly with hand operated insert installation apparatus. For example, certain known apparatus incorporate a head or driver which is reciprocated under manual control toward and away from a thermoplastics component and utilizes both heat, which is imparted to the insert through a mandrel or tip assembly of the tool, and mechanical pressure which is manually applied by the tool operator.

Examples of these known techniques are found in United Kingdom patent specification No. 1,415,513 entitled "Improvements in and Relating to the Application of Metal Fittings to Thermoplastics Components" published Nov. 26, 1975 and issued to Armstrong Patents Co. Limited and which discloses a method of applying a metal fitting and applying heat directly to the fitting by means of a heated tool to effect local softening of thermoplastics material around a pilot hole and then exerting a mechanical pressure by means of the tool on the fitting to penetrate into the component. U.S. Pat. No. 3,926,356 entitled "Inserts" issued Dec. 16, 1975 in the name of L. E. Still discloses an apparatus utilizing a double acting piston for sequentially driving inserts into a thermoplastics workpiece incorporating a shoe for preheating the inserts with the shoe being coupled with the mandrel reciprocated by the double acting piston for supplying inserts one at a time.

As is known, the thermoplastics component is normally temporarily located in a fixed jig or other suitable device. In most such devices, the depth to which the insert is installed is dependent upon operator judgment with varying results in consistency and uniformity of the insert installation. Other devices depend upon sensitive operator judgment as to both the pressure and the timing of the mechanical pressure or driving force to be applied to the insert relative to the condition of the surrounding heated thermoplastics workpiece. Premature application of the insert installation force may result in splitting or cracking, e.g., of a workpiece or undesired introduction of stresses which may later result in a damaged product.

These problems are particularly evident in applications involving workpieces having relatively thin sidewalls surrounding a preformed opening for receiving an insert. Such workpieces are particularly susceptible to an operator imparting an excessive insertion pressure before the workpiece has reached a critical temperature to permit full flow of its thermoplastics material ensuring solid bonding of that material with the insert without creating undesired and unnecessary stresses in the workpiece and concommitant damage later such as splitting of the workpiece shell.

One approach which has been utilized to overcome the above problems is a mechanical spring for driving a heated tool bit independently of its carrier once the carrier is moved to an actuating position. The spring is manually overridden upon movement of the driver into the actuating position after arrest of the bit in an insert engagement position to apply an insert driving force on the bit under the influence of the spring to fully install the insert into the workpiece upon subsequent softening of its thermoplastics material.

SUMMARY OF THE INVENTION

The subject invention has distinct and significant advantages over the known prior art wherein a preselected installation pressure is determined to be necessary to ensure penetration of a given size insert into a specified thermoplastics material under varying ambient conditions and particularly wherein the tool applications require inserts of different sizes and shapes to be driven into thermoplastics workpieces of different types, demanding a multiplicity of adjustment requirements which frequently result in undesired tool downtime and an investment of skilled labor time.

Accordingly, a primary object of this invention is to provide an improved readily adjustable press which will ensure consistent and uniform, high quality installation of metal inserts into thermoplastics material under varying ambient conditions once the tool of this invention has been set up for a given job while eliminating heretofore sensitive operator judgment as to the required insert installation driving force and its timing relative to the condition of the workpiece being melted to permit insert penetration; a related object is to provide such a tool featuring significantly improved adjustment capabilities for varying the insert installation pressure or driving force applied to the insert to be inserted into the workpiece in an inexpensive tool which features a readily adjustable air biasing drive system for applying a preselected substantially constant insert driving force on the bit.

Figure 1:
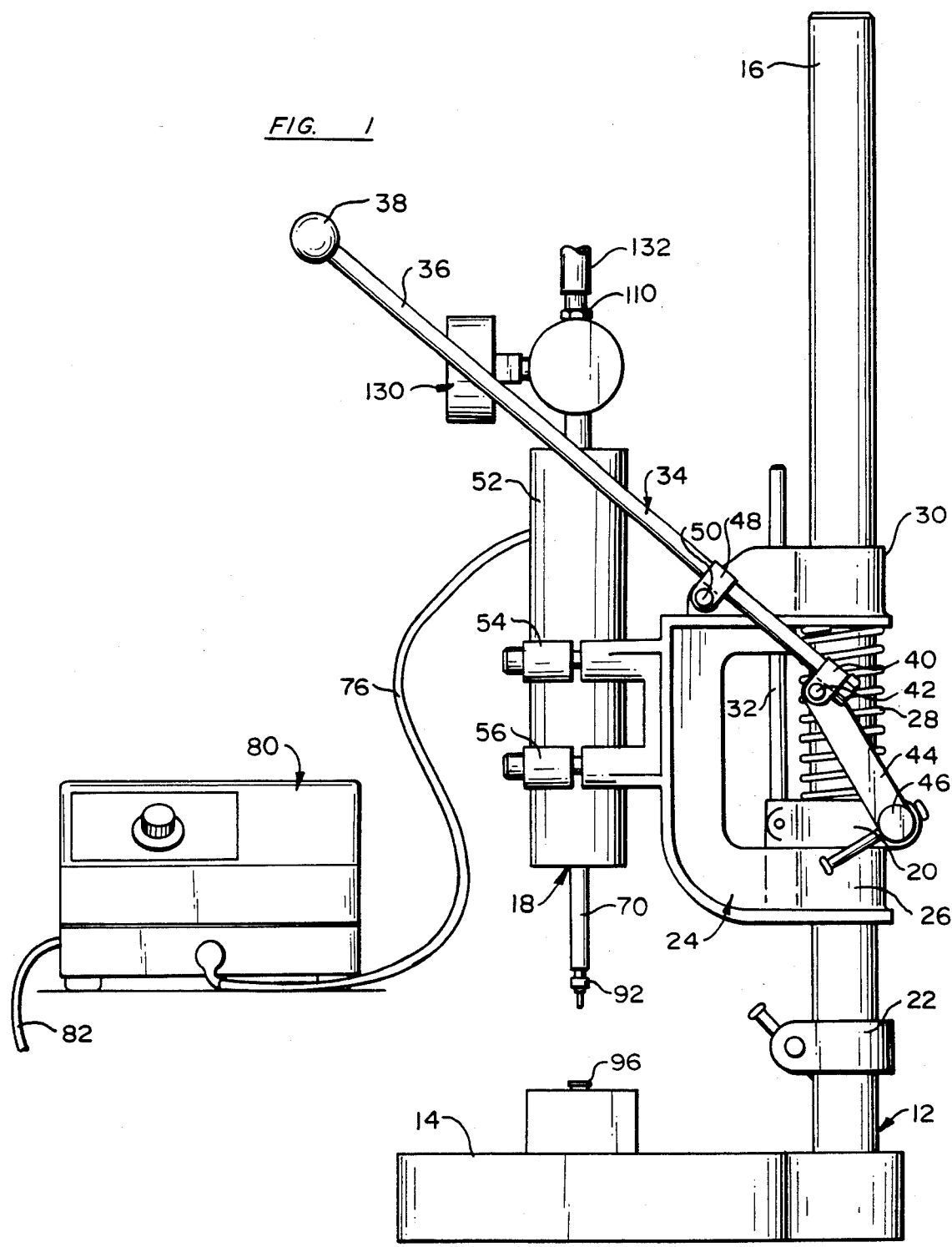
FIG. 1 is an isometric view of a thermal press incorporating this invention.

Referring now to the drawings in detail, a thermal press, generally designated 10, has a bench stand 12 with a base 14 and upright post 16 fixed to base 14. A bit heat driver or insert driver is generally designated by the reference numeral 18 and is supported for reciprocable movement on post 16 along a vertical axis between upper and lower adjustment clamps 20, 22 which establish upper and lower stroke limit positions of driver 18. Driver 18 has a mounting bracket 24 supported for vertical sliding movement on post 16 between its starting position (illustrated in FIG. 1) established by engagement of a lower collar 26 of the mounting bracket 24 with the upper clamp 20, and a ready operative position defined by engagement of the lower collar 26 of the mounting bracket 24 with the lower clamp 22. Upper and lower clamps 20, 22 are adjustably secured in preselected positions on post 16 of the bench stand 12. A spring 28 is illustrated as being coiled about post 16 with a lower end of the spring 28 seated on the upper adjustment clamp 20 and an upper end of the spring 28 engaging an upper collar 30 of the driver mounting bracket 24 for effecting return of driver 18 into its illustrated starting position. For ensuring precise vertical reciprocation of the driver 18, a guide 32 is vertically secured in the upper adjustment clamp 20 to extend through a guide opening, not shown, in the upper collar 30 of the driver mounting bracket 24.

For reciprocating driver 18 between its starting and ready operative positions, any suitable means may be utilized including a hand operated crank mechanism 34 illustrated in FIG. 1. Crank mechanism 34 includes a drive lever 36 having an operating knob 38 at its free end and connected at its opposite end by a link 40 secured by pin 42 to a pivot arm 44 which, in turn, is pivotally supported on a horizontally extending arm 46 of the fixed upper adjustment clamp 20 secured to post 16. Lever 36 is secured intermediate its ends to a second link 48 which is supported by pin 50 for pivoting movement on mounting bracket 24 adjacent its upper collar 30.

Accordingly, driver 18 may be manually driven vertically downwardly toward the base 14 of bench stand 12 upon depressing lever 36 of its crank mechanism 34 to drive mounting bracket 24 against the force of its return spring 28 and into engagement with lower adjustment clamp 22 fixed to the upright post 16 of stand 12. Upon release of lever 36, the spring 28 automatically ensures return of the driver 18 into starting position with the lower collar 26 of its mounting bracket 24 once again engaged against the upper adjustment clamp 20 fixed on post 16.

As seen in FIG. 1, heat insert driver 18 additionally includes a cylindrical housing 52, preferably formed of a suitable metal, which is secured to mounting bracket 24 by any suitable means such as illustrated clamps 54 and 56 which releasably secure housing 52 in precisely vertically disposed relation.

Heat insert driver 18 incorporates a self-contained heating unit comprising a conventional electrical soldering unit 58 (FIGS. 2 and 3) coaxially supported for reciprocation within the cylindrical housing 52 along an axis of movement coincident with the axis of movement of the heat insert driver cylinder 52. The soldering unit 58 will be understood to have a body 60 formed of suitable insulation material providing both thermal and electrical insulation.

Figure 2:
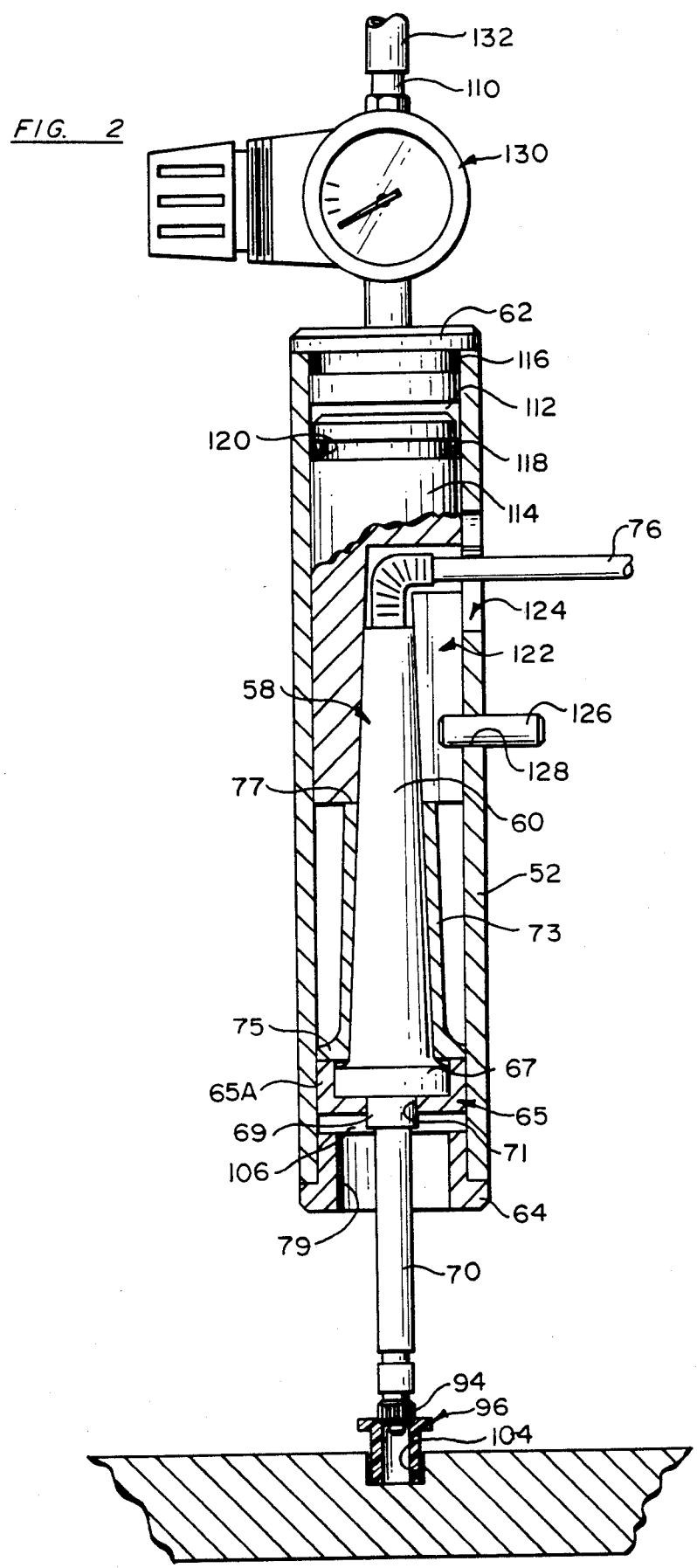
FIG. 2 is a side view, partly broken away and partly in section, showing a heat insert driver of the tool of FIG. 1 in a ready operative position with its bit in an insert engagement position relative to a metal insert which is to be driven into a thermoplastics workpiece.
Figure 3:
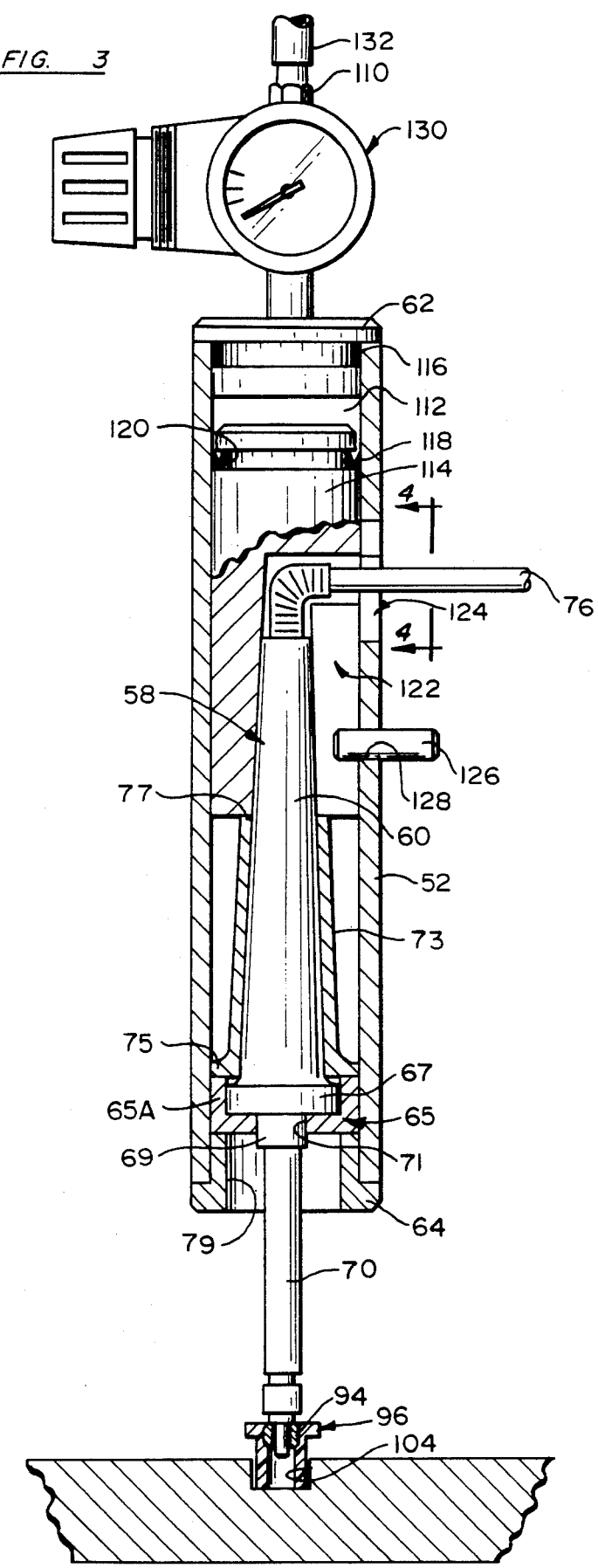
FIG. 3 is a view similar to FIG. 2 showing the bit in a fully extended position with the insert seated in flush relation to a thermoplastics workpiece.

As best seen in FIGS. 2 and 3, opposite ends of housing 52 are provided with end caps 62 and 64 which are shown threadably engaged with upper and lower sidewall portions of the cylindrical housing 52. The soldering unit 58 has a standard electrical heating element, not shown, which may be thermostatically controlled, and an axially extending elongated core 70 formed of material of high thermal conductivity and adapted to be heated by the heating element.

To ensure precision alignment of the heating core 70 during its movement in precisely aligned coincident relation to the axis of movement of the cylindrical housing 52 of driver 18, a centrally apertured alignment cup 65 is fitted in fixed relation to an enlarged collar 67 at the base of soldering unit body 60 and circumferentially envelopes the sidewall of collar 67 and a depending heating core sleeve 69 which projects through central opening 71 of cup 65. As illustrated, heating unit body 60 is tapered upwardly and has an outer insulating jacket 73 with a radially outwardly flared base 75 in overlying engagement with upstanding sidewall 65A of cup 65. Jacket 73 is likewise tapered upwardly in close fitting contact with body 60 of the heating unit 58 and terminates in an annular shoulder 77 intermediate the ends of body 60. By virtue of the disclosed construction, alignment cup 65 precisely centers the heating unit 58 and its protruding core 70 coaxially within cylindrical housing 52.

The core 70 is illustrated as protruding coaxially through a central opening in lower housing end cap 64. The heating core 70 is of reduced diameter relative to the body 60 of the soldering unit 58 and will be understood to be secured in thermally conductive relation to its heating element in a suitable conventional manner. Electrical leads to the heating element are provided in cord 76 trained through the upper end of body 60 and will be understood to be connected to a power and temperature control unit 80 (FIG. 1) which, in turn, has a power cord 82 connected to a suitable source of electrical power, not shown. The control unit 80 is of any conventional type adapted to selectively set the thermostatically controlled heating element of the heating unit 58 and preferably provides a visual readout of the heating element temperature converted to a tip temperature for selectively establishing a desired insert installation temperature.

Figure 5:
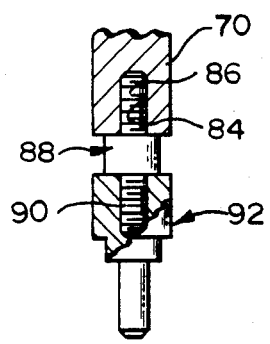
FIG. 5 is a side view, partly broken away and partly in section, showing a tip assembly of the tool of FIG. 1.

As best seen in FIG. 5, the core 70 of heating unit 58 has an internally threaded opening 84 at its tip for securing an externally threaded end 86 of a heat sink adapter 88 which is illustrated as having an enlarged intermediate collar and an opposite threaded end 90 of reduced diameter for securing a heat sink insertion bit 92. The latter is formed of a material of high thermal conductivity, as is the adapter 88, so as to be suited to be electrically heated by core 70. By such construction, it will be seen that bit 92 is adapted to be heated by the heating element via core 70 and its adapter 88 for in turn heating a metal insert 94 preliminary to its installation in a thermoplastics workpiece 96. As will be appreciated by those skilled in the art, the bit 92 is configured to engage a central bore, e.g., of an insert, and the disclosed construction is particularly suited to interchange bits of different size and shape for applications with various insert sizes and shapes. The operating cycle time for a given insert installation will likewise vary, depending on the type of thermoplastic utilized in the workpiece, the size of the insert, the heat sink temperature and the applied insert installation pressure.

More specifically and in accordance with the subject invention, a composite drive system is incorporated in the thermal press of this invention which provides for driving the tool bit independently of driver 18 when the driver is in its ready operative position to fully install an insert into the workpiece 96 upon softening of the thermoplastics while effecting driving of the bit 92 totally independently of driver 18 during the throw of bit 92 under the influence of the bit biasing means. Moreover, the subject invention provides quick and easy adjustment of the thermal press for quickly changing a set-up for a given insert installation in varying types of thermoplastics materials to meet heretofore commonly encountered but unresolved problems in effecting an automatic insert driving stroke which is not dependent upon operator judgment and which is particularly suited to be customized to the requirements of a given insert installation for optimized timing and insert installation force to be applied. Such action ensures a uniformly repetitive, high-quality installation for specified inserts in a given job utilizing a particular thermoplastics workpiece.

The composite driving system of this invention utilizes an air biasing drive system wherein air from a suitable source of compressed air, not shown, is supplied to a fluid coupling 110 mounted on upper cylinder end cap 62 to be supplied to a chamber 112 wherein a piston 114, drivingly engaged with shoulder 77 of heating unit jacket 73 is supported for reciprocating movement within cylinder 52.

Figure 4:
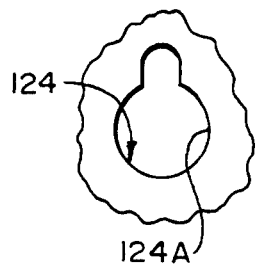
FIG. 4 is a side elevational view, partly broken away, taken generally along line 4—4 of FIG. 3.

For sealing chamber 112, a suitable O-ring seal 116 is mounted in sealing engagement between upper cylinder end cap 62 and an interior sidewall surface of cylinder 52, and a U-ring seal 118 is disposed in a groove 120 circumferentially extending about an upper end of piston 114. Piston 114 is preferably formed with an axially extending slot 122 registrable with a keyhole opening 124 in the cylinder sidewall below the U-ring seal 118 even in the fully extended position (FIG. 3) of piston 114. As best seen in FIG. 4, keyhole opening 124 is of sufficient size such that an electrical connector (not shown) on the end of cord 76 may be threaded through the enlarged keyhole opening 124A during assembly and disassembly of driver 18. To maintain the integrity of the power cord 76, the heat insert driver 18 provides a key 126 extending through a suitable opening 128 in the cylinder sidewall and into the confines of the axially extending piston slot 122 to maintain the slot 122 and the keyhole 124 in registration and to prevent undesired relative angular displacement of cylinder 52 and piston 114 relative to one another which may otherwise be harmful to heating element power cord 76 such as, for example, during interchanging bit 92 on core adaptor 88 for use with an application of different size inserts.

By such construction, the heating unit 58 (including its adaptor 88 and bit 92) will normally be in a fully extended position (FIG. 3) with lower cylinder end cap 64 serving as a stop for alignment cup 65 at the base of the heating unit body 58. During set up for a given job, the manual crank mechanism 34 is operated by grasping the lever 36 and pulling it downwardly to a desired height corresponding to the maximum depth required in a given insert installation, depending on the height of the insert 94 relative to the upper surface of the thermoplastics workpiece 96, and the level or height of the tip of bit 92 at its fully extended position (FIG. 3) required in relation to workpiece 96 to precisely set insert 94 in installed position at the desired depth. The maximum throw establishing this predetermined required level of the tip of insertion bit 92 is accordingly selectively established relative to the desired height to which a fitting, stud or other type insert is desired to be driven into thermoplastics workpiece 96. Thereafter, lower clamp 22 is secured in an adjusted position on post 16 to engage lower collar 26 of mounting bracket 24 establishing a repeatable maximum throw limit position of the heat insertion bit 92 for a given job, and upper bracket 20 is adjusted on post 16 to permit the heat insert driver 18 to be returned under the influence of its spring 28 to a desired upper limit starting position.

In accordance with yet another aspect of this invention, a pressure regulator 130 of conventional design is incorporated in the air supply line 132 leading to upper chamber 112 of the air drive system of the thermal press 10 of this invention. Pressure regulator 130 may be pre-set for a given insert installation driving pressure which is predetermined for a specified insert installation job. By virtue of such construction, an adjustable air biasing mechanism is provided to consistently and constantly provide a preselected insert installation driving pressure within chamber 112 for automatically compensating for differences in ambient temperature and pressure wherein the thermal press 10 of this invention is to be utilized, as well as for compensating for any inherent leakage within the disclosed air biasing drive system. Specifically, the pressure regulator 130, which may be of conventional design, is preset to maintain a constant air pressure within drive chamber 112 above piston 114. Moreover, pressure regulator 130 will be seen to be quickly and easily adjusted for different desired pressures to effect an operating stroke of bit 92 during an insert installation for different applications using various materials and different sizes and shapes of inserts.

Accordingly, a constantly adjusted insert installation operating pressure is effected by the disclosed invention wherein a controlled driving insert installation pressure on the insert 94 (being heated by bit 92) is effected upon manually operating the crank mechanism 34 to move driver 18 into its ready operative position. That is, with control unit 80 energized and its readout providing a desired bit tip temperature, an insert 94 is located on workpiece 96 in coaxial alignment with the axis of movement of the overlying insertion bit 92. Insert 94 is preferably positioned in a preformed opening in workpiece 96 such as illustrated at 104 in FIGS. 2 and 3. The heat insert driver 18 is then manually driven from its starting position (FIG. 1) into its lowermost ready operative position (FIGS. 2 and 3) by manual actuation of crank lever 36. This action causes bit 92 to be driven into intimate heat transfer relation to metal insert 94 resting on a cold thermoplastics workpiece 96 and against the biasing force of the air drive system whereupon further movement of bit 92 is arrested and the adjustable air biasing force is manually overcome by continued movement of cylindrical housing 52 relative to heating unit 58 into ready operative position of driver 18. The travel of driver housing 52 is thereafter arrested upon engagement of lower collar 26 against lower clamp 22 on post 16 establishing the ready operative position of driver 18 and creating a gap 106 (FIG. 2) between cup 65 and housing end cap 64.

Such action accordingly activates the adjustable air biasing drive system of this invention to exert a driving force on self-contained heating unit 58 via engagement between piston 114 under the influence of the air pressure in chamber 112 on shoulder 77 of heating unit jacket 73. Upon arrest of the bit movement and manual override of the air drive system, the volume of air within chamber 112 is reduced, whereupon pressure regulator 130 vents that chamber 112 to atmosphere to establish the previously set pressure preliminary to an actual operating stroke or insert driving force effecting penetration by of insert 94 thermoplastics workpiece 96.

As the material of the thermoplastics workpiece 96 surrounding insert 94 melts from the concentrated heat flow emanating from bit 92 engaging insert 94, the heating unit 58 including its core 70, adaptor 88 and bit 92 are automatically driven in unison downwardly under a uniformly controlled force effected by the air biasing drive system of this invention to install insert 94 into thermoplastics workpiece 96 upon its reaching a critical temperature to ensure optimum material flow. Workpiece 96 is thus penetrated at a consistently uniform height to fully seat insert 94 in flush relation, e.g., with the upper surface of workpiece 96. As piston 114 is driven downwardly under the force of air pressure in chamber 112, the pressure regulator 130 is operative to add air to chamber 112 and to maintain the previously set air pressure, thereby automatically compensating for any differences in pressure and temperature of ambient operating conditions and leakage from the system and to effect a constant pressure in chamber 112 in accordance with the pre-set operating pressure throughout the insert installation operating stroke of the unit.

The heating unit, its core, adaptor and bit are automatically and uniformly driven by the disclosed driving force, under a preselected operating pressure within chamber 112 of the air drive system, downwardly relative to cylinder housing 52, which is maintained in its ready operative position upon engagement of its lower mounting bracket collar 26 against the lower post clamp 22 under continuous control of the depressed lever 36. Once movement of heating unit 58 is arrested by engagement of its alignment cup 65 with the upper shoulder of lower cylinder end cap 64, movement of the insertion bit 92 and insert 94 is likewise arrested.

Upon an operator observing the arrest of movement of the bit 92 and insert 94, he need only permit the crank lever 36 to return into starting position in readiness for the next operating cycle. Thereafter, workpiece 96 cools and resolidifies to secure insert 94 in a strong, permanently embedded installation.

As will be seen, no need whatsoever is required on the part of the operator to apply any sensitive judgment as to the pressure required to effect the desired driving force for an insert installation for a given job regardless of air leakage from the drive system or differences in temperature or pressure under which a given job is being performed. In addition to such automatic compensation for ambient temperature and pressure conditions and for compresation for air leakage of a particular tool, the tool which incorporates the subject invention is quick and easy to adjust to readily effect a desired operating stroke providing a substantially constant insert driving force for a given job.

If any failure of heating unit 58 should occur, it is only necessary to remove upper cylinder end cap 62 after disconnecting coupling 110 from the line 132 leading to the source of air pressure, whereupon piston 114 may be withdrawn from cylinder 52 to permit removal of heating unit 58 in its entirety. The heating unit 58 then may be replaced with a new heating unit which thereupon can be provided with an appropriate adaptor insertion bit for a given insert installation job.

As will be apparent to persons skilled in the art, various modifications, adaptations and variations of the foregoing specific disclosure can be made without departing from the teaching of this invention.

I claim:

1. A press for installing metal inserts into a workpiece of thermoplastics material and comprising a frame, a driver mounted on the frame for reciprocation toward and away from the thermoplastics workpiece, throw limit positioning means on the frame for establishing a starting position for the driver and a ready operative position for the driver, the starting position for the driver being remotely spaced relative to the workpiece and the ready operative position for the driver being adjacent the workpiece, a bit supported by the driver for reciprocation toward and away from the workpiece, heating means for the bit, the bit being engageable with an insert upon movement of the driver from starting position to said ready operative position for applying heat directly to the insert causing it to locally melt the thermoplastic workpiece, the driver further including a stop member for limiting movement of the bit and an air biasing drive system for moving the bit to an extent limited by the stop member, the air biasing drive system operating to move the bit independently of the driver when the driver is in a stationary condition in its said ready operative position, the throw limit positioning means maintaining the driver in stationary condition in its said ready operative position during such bit movement, the air biasing drive system including adjustable pressure regulating means to apply a preselected substantially constant insert driving force on the bit to advance the insert into the workpiece upon softening of its thermoplastics material responsive to bit movement relative to the driver in its said ready operative position.

2. The press of claim 1 wherein the driver includes a cylindrical housing, an air supply inlet connected to a source of compressed air, the pressure regulating means including an adjustable pressure regulator in the air supply inlet for maintaining the pressure of the air in the housing at a preset uniform level, and wherein the heating means comprises a self-contained heating unit mounted for reciprocating movement in the housing and drivingly connected to the bit.

3. The press of claim 1 wherein driver movement from starting to ready operative positions effects movement of the bit supported by the driver into an insert engagement position of the bit to temporarily arrest bit movement prior to the arrest of driver movement in one linear direction from the starting position of the driver into said ready operative position as determined by the throw limit positioning means, and wherein continued movement of the driver in said one linear direction into its ready operative position after arrest of the bit in its insert engagement position activates the air biasing drive system for driving the bit independently of the driver.

4. The press of claim 1 wherein the stop member of the driver cooperates with the bit to establish a fully extended position for the bit, wherein the air biasing drive system applies a driving force to the bit for urging it from an insert engagement position to said fully extended position, the bit in insert engagement position being retracted relative to the driver in its ready operative position, the bit in its said fully extended position, as determined by the stop member, causing the insert to be completely seated in flush relation to the workpiece.

5. The press of claim 4 wherein the bit is automatically driven by the driver into insert engagement position against the force of the air biasing drive system upon movement of the driver from starting position into ready operative position to condition the air biasing drive system to drive the bit into fully extended position entirely independently of the driver, the throw limit positioning means maintaining the driver in its ready operative position during the throw of the bit under the influence of the air biasing drive system from said insert engagement position to said fully extended position of the bit as determined by the stop member.

6. The press of claim 5 further including manual operating means drivingly connected to the driver for moving it between its starting position and its ready operative position, the air biasing drive system being manually overridden upon movement of the driver into its ready operative position.

7. The press of claim 1 wherein the heating means includes an axially protruding core with the bit fixed to the tip of the core, and wherein the driver includes a housing supporting the heating means for relative reciprocation, the housing including said stop member, said stop member being engageable with the heating means to establish the fully extended position of the bit under the driving influence of the air biasing drive system.

8. The press of claim 1 wherein the throw limit positioning means for the driver includes adjustment means on the frame for selectively establishing throw limit positions of the driver in its said starting and ready operative positions, and return means cooperating with the frame and the driver for continuously urging the driver into its starting position.

9. The press of claim 8 wherein the heating means comprises a self-contained soldering unit having a body of insulating material providing heating and electrical insulation and mounted for reciprocating movement within the housing, the soldering unit having an electrical heating element and a core in thermal conducting relation thereto adapted to be heated by the heating element and protruding axially beyond the housing with the bit being fixed to the tip of the core in thermal conducting relation thereto.

10. The press of claim 9 wherein the soldering unit is replaceable as a unit in its entirety in the driver housing.

11. A press for installing metal inserts into a workpiece of thermoplastics material and comprising a frame, a driver including a cylindrical housing mounted on the frame for reciprocation toward and away from the thermoplastics workpiece between a starting position remotely spaced relative to the workpiece and a ready operative position adjacent the workpiece, a bit supported by the driver for reciprocation toward and away from the workpiece, the bit having a self-contained heating unit mounted for reciprocating movement in the housing and drivingly connected to the bit, the bit being engageable with an insert upon movement of the driver from starting position to said ready operative position for applying heat directly to the insert causing it to locally melt the thermoplastics workpiece, an air supply inlet connected to a source of compressed air, and a piston being mounted in the housing between the air supply inlet and the heating unit for reciprocating movement in the housing, the piston being in driving engagement with the heating unit, the driver further including an air biasing drive system for moving the bit independently of the driver when it is in said ready operative position, the air biasing drive system including an adjustable pressure regulator in the air supply inlet for maintaining the pressure of the air in the housing at a preset uniform level, to apply a preselected substantially constant insert driving force on the bit to advance the insert into the workpiece upon softening of its thermoplastics material.

12. The press of claim 11 wherein the heating unit includes a ddrive shoulder thereon, wherein the piston and the heating unit are in telescoped driving relation to one another with the piston in driving engagement with the drive shoulder of the heating unit.

13. The press of claim 12 further including cooperating key and slot means between the cylindrical housing and piston for maintaining the same in a predetermined angular alignment.

14. The press of claim 13 wherein the slot means is formed in the piston, wherein the cooperating key is fixed in the housing, and wherein the housing includes a sidewall power cord opening for the heating unit, the housing sidewall power cord opening being in communication with the slot means in the piston.

15. The press of claim 12 wherein the heating unit has an enlarged diameter guide portion engageable with an inner sidewall of the housing and providing precision alignment of the heating unit therein.

16. A press for installing metal inserts into a workpiece of thermoplastics material and comprising a frame, a driver including a housing mounted on the frame for reciprocation toward and away from the thermoplastics workpiece between a starting position remotely spaced relative to the workpiece and a ready operative position adjacent the workpiece, adjustment means on the frame for selectively establishing throw limit positions of the driver in its said starting and ready operative positions, return means cooperating with the frame and the driver for continuously urging the driver into its starting position, and a bit supported by the driver for reciprocation toward and away from the workpiece, the bit including a self-contained soldering unit having a body of insulating material providing heating and electrical insulation and mounted for reciprocating movement within the housing, the soldering unit having an electrical heating element and a core in thermal conducting relation thereto adapated to be heated by the heating element and protruding axially beyond the housing with the bit being fixed to the tip of the core in thermal conducting relation thereto, the bit being engageable with an insert upon movement of the driver from said starting position to said ready operative position for applying heat directly to the insert causing it to locally melt the thermoplastics workpiece, the soldering unit being replaceable as a unit in its entirety in the driver housing, the driver further including an air biasing drive system for moving the bit independently of the driver when it is in said ready operative position, the soldering unit including a drive surface thereon, the air biasing drive system acting to apply an insert installation driving force to said drive surface to move the soldering unit and the bit in unison relative to the driver housing between said insert engagement position and a fully extended position of the bit, independently of the driver, the air biasing drive system including adjustable pressure regulating means to apply a preselected substantially constant insert driving force on the bit to advance the insert into the workpiece upon softening of its thermoplastics material.

* * * * *